(12) United States Patent
Jang et al.

(10) Patent No.: US 8,865,040 B2
(45) Date of Patent: Oct. 21, 2014

(54) HIGHLY CONDUCTIVE COMPOSITES FOR FUEL CELL FLOW FIELD PLATES AND BIPOLAR PLATES

(75) Inventors: Bor Z. Jang, Centerville, OH (US); Aruna Zhamu, Centerville, OH (US); Lulu Song, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 248 days.

(21) Appl. No.: 13/021,041

(22) Filed: Feb. 4, 2011

(65) Prior Publication Data
US 2011/0143022 A1 Jun. 16, 2011

Related U.S. Application Data

(62) Division of application No. 11/324,370, filed on Jan. 4, 2006, now abandoned.

(51) Int. Cl.
- *C04B 35/00* (2006.01)
- *H01M 8/02* (2006.01)
- *C08J 5/04* (2006.01)
- *H01B 1/24* (2006.01)

(52) U.S. Cl.
CPC .............. *H01M 8/0221* (2013.01); *C08J 5/04* (2013.01); *H01B 1/24* (2013.01); *H01M 8/0213* (2013.01); *H01M 8/0226* (2013.01); *H01M 8/0228* (2013.01); *Y02E 60/50* (2013.01)
USPC ............ 264/104; 264/105; 264/413; 264/48; 264/628; 264/637; 264/437; 264/439; 264/440; 264/636; 264/640; 264/641; 264/642; 264/86; 264/651; 264/284; 264/293; 264/45.1; 264/139; 264/241

(58) Field of Classification Search
USPC ......... 264/104, 105, 413, 416, 437, 439, 440, 264/48, 637, 636, 642, 651, 86, 509, 119, 264/284, 293, 1.7, 471, 480, 487, 490, 493, 264/45.1, 139, 241, 45.3, 640, 641; 429/400, 401, 535, 457, 518, 520
See application file for complete search history.

(56) References Cited

U.S. PATENT DOCUMENTS

| | | | |
|---|---|---|---|
| 5,300,370 A | | 4/1994 | Washington et al. |
| 5,942,347 A | * | 8/1999 | Koncar et al. ................. 429/460 |
| 6,037,073 A | | 3/2000 | Besmann et al. |
| 6,171,720 B1 | | 1/2001 | Besmann et al. |
| 6,248,467 B1 | | 6/2001 | Wilson et al. |

(Continued)

*Primary Examiner* — Jeffrey Wollschlager
*Assistant Examiner* — Stella Yi
(74) *Attorney, Agent, or Firm* — Mark Leuy; Thompson Hine LLP

(57) ABSTRACT

This invention provides a fuel cell flow field plate or bipolar plate having flow channels on faces of the plate, comprising an electrically conductive polymer composite. The composite is composed of (A) at least 50% by weight of a conductive filler, comprising at least 5% by weight reinforcement fibers, expanded graphite platelets, graphitic nano-fibers, and/or carbon nano-tubes; (B) polymer matrix material at 1 to 49.9% by weight; and (C) a polymer binder at 0.1 to 10% by weight; wherein the sum of the conductive filler weight %, polymer matrix weight % and polymer binder weight % equals 100% and the bulk electrical conductivity of the flow field or bipolar plate is at least 100 S/cm. The invention also provides a continuous process for cost-effective mass production of the conductive composite-based flow field or bipolar plate.

13 Claims, 13 Drawing Sheets

(56) References Cited

U.S. PATENT DOCUMENTS

| | | | |
|---|---|---|---|
| 6,503,652 B2 * | 1/2003 | Reynolds et al. | 429/535 |
| 6,811,918 B2 | 11/2004 | Blunk et al. | |
| 6,881,512 B2 | 4/2005 | Saito et al. | |
| 6,939,638 B2 | 9/2005 | Saito et al. | |
| 2002/0160252 A1 * | 10/2002 | Hirahara et al. | 429/44 |
| 2003/0129471 A1 | 7/2003 | Kitade et al. | |
| 2004/0229993 A1 * | 11/2004 | Huang et al. | 524/495 |
| 2004/0234698 A1 * | 11/2004 | Wilt et al. | 427/385.5 |

\* cited by examiner (a)

(b)

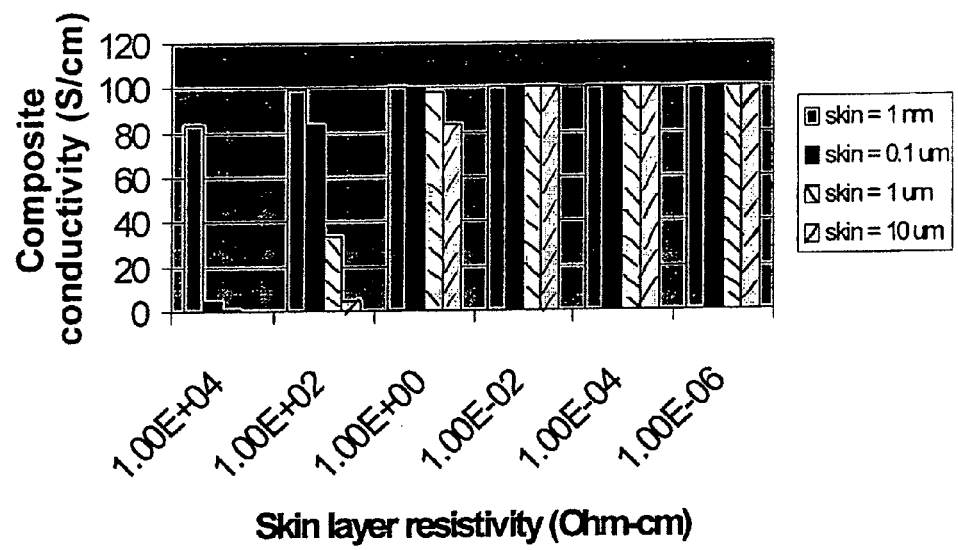

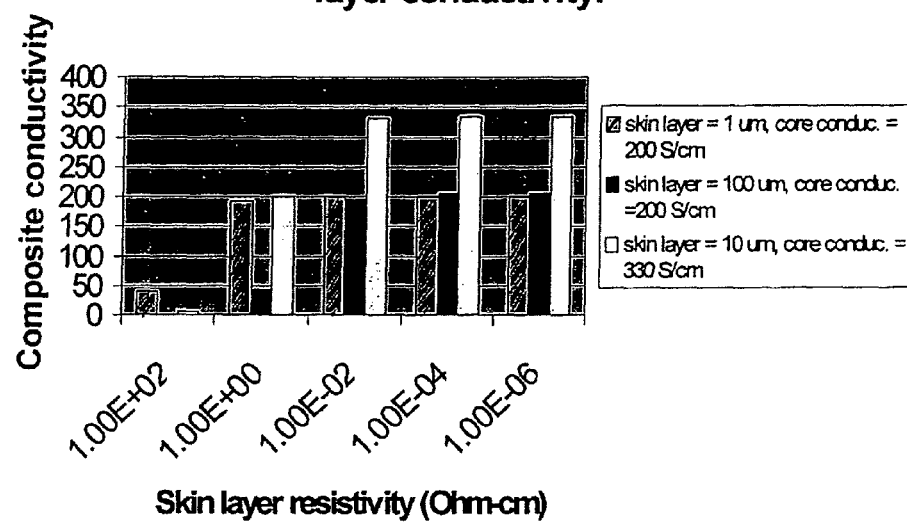

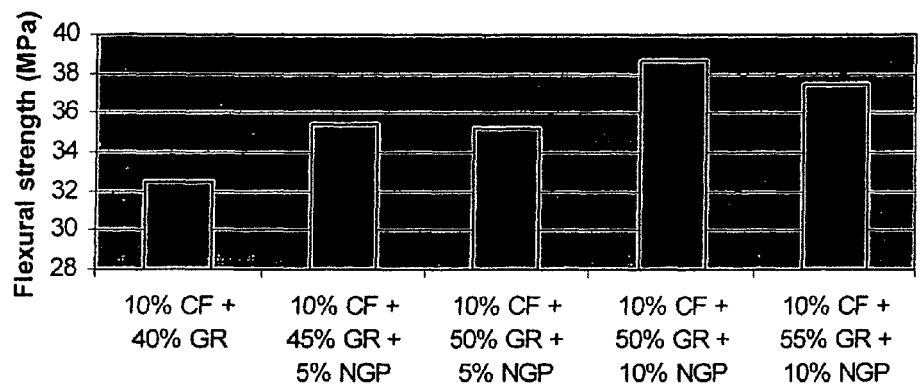
FIG.10: Effect of conductive filler type and proportion on flexural strength.

US 8,865,040 B2

HIGHLY CONDUCTIVE COMPOSITES FOR FUEL CELL FLOW FIELD PLATES AND BIPOLAR PLATES

The present invention is based on the research results of a project supported by the US Department of Energy SBIR-STTR Program. The US government has certain rights on this invention.

FIELD OF THE INVENTION

The present invention provides a highly electrically conductive composite material for use in a fuel cell bipolar plate or flow field plate.

BACKGROUND OF THE INVENTION

A proton exchange membrane (PEM) fuel cell is typically composed of a seven-layered structure, including (a) a central PEM electrolyte layer for proton transport; (b) two electro-catalyst layers on the two opposite primary surfaces of the electrolyte membrane; (c) two fuel or gas diffusion electrodes (GDEs, hereinafter also referred to as diffusers) or backing layers stacked on the corresponding electro-catalyst layers (each GDE comprising porous carbon paper or cloth through which reactants and reaction products diffuse in and out of the cell); and (d) two flow field plates (or a bi-polar plate) stacked on the GDEs. The flow field plates are typically made of graphite, metal, or conducting composite materials, which also serve as current collectors. Gas-guiding channels are defined on a GDE facing a flow field plate or, more typically, on a flow field plate surface facing a GDE. Reactants (e.g., $H_2$ or methanol solution) and reaction products (e.g., $CO_2$ at the anode of a direct methanol fuel cell, and water at the cathode side) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling channels and humidifying plates may be added to assist in the operation of a fuel cell stack.

In one common practice, a fuel flow field plate and an oxidant gas flow field plate are separately made and then assembled together to form a bipolar plate (one side of a bipolar plate serving as a negative terminal and the other side as a positive terminal, hence the name). In some cases, an additional separator is sandwiched between the two flow field plates to form a three-layer bipolar plate. It would be highly advantageous if the flow filed plates and the separator can be mass-produced into an integrated bipolar plate assembly. This could significantly reduce the overall fuel cell production costs and reduce contact ohmic losses across constituent plate interfaces. The bipolar plate is known to significantly impact the performance, durability, and cost of a fuel cell system. The bipolar plate, which is typically machined from graphite, is one of the most costly components in a PEM fuel cell.

Fluid flow field plates or bipolar plates have open-faced channels formed in one or both opposing major surfaces for distributing reactants to the gas diffuser plates which are the anode and cathode backing layers, typically made of carbon paper or fabric. The open-faced channels also provide passages for the removal of reaction products and depleted reactant streams. Optionally, a bipolar plate may have coolant channels to manage the fuel cell temperature. A flow field plate or bipolar plate should have the following desirable characteristics: high electrical conductivity (e.g., preferably having a conductivity no less than 100 S/cm), low permeability to fuel or oxidant fluids, good corrosion resistance, and good structural integrity.

Conventional methods of fabricating fluid flow field plates or bipolar plates require the engraving or milling of flow channels into the surface of rigid plates formed of a metal, graphite, or carbon-resin composite. These methods of fabrication place significant restrictions on the minimum achievable fuel cell thickness due to the machining process, plate permeability, and required mechanical properties. Further, such plates are expensive due to high machining costs. The machining of channels into the graphite plate surfaces causes significant tool wear and requires significant processing times.

Alternatively, fluid flow field plates can be made by a lamination process (e.g., U.S. Pat. No. 5,300,370, issued Apr. 5, 1994 to Washington, et al.), wherein an electrically conductive, fluid impermeable separator layer and an electrically conductive stencil layer are consolidated to form one open-faced channel. Presumably, two conductive stencil layers and one separator layer may be laminated to form a three-layer bipolar plate. Such laminated fluid flow field assemblies tend to have higher manufacturing costs than integrated plates, due to the number of manufacturing steps associated with forming and consolidating the separate layers. They are also prone to delamination due to poor interfacial adhesion and vastly different coefficients of thermal expansion between a stencil layer (typically a metal) and a separator layer.

A variety of composite bipolar plates have been developed, which are mostly made by compression molding of polymer matrices (thermoplastic or thermoset resins) filled with conductive particles such as graphite powders or fibers. Because most polymers have extremely low electronic conductivity, excessive conductive fillers have to be incorporated, resulting in an extremely high viscosity of the filled polymer melt or liquid resin and, hence, making it very difficult to process. Bi-polar plates for use in PEM fuel cells constructed of graphite powder/fiber filled resin composite materials and having gas flow channels are reviewed by Wilson, et al (U.S. Pat. No. 6,248,467, Jun. 19, 2001). Injection-molded composite-based bipolar plates are disclosed by Saito, et al. (U.S. Pat. No. 6,881,512, Apr. 19, 2005 and No. 6,939,638, Sep. 6, 2005). These thermoplastic or thermoset composites exhibit a bulk conductivity significantly lower than 100 S/cm (the US Department of Energy target value), typically not much higher than 10 S/cm.

Besmann, et al. disclosed a carbon/carbon composite-based bipolar plate (U.S. Pat. No. 6,171,720 (Jan. 9, 2001) and No. 6,037,073 (Mar. 14, 2000)). The manufacture process consists of multiple steps, including production of a carbon fiber/phenolic resin preform via slurry molding, followed by a compression-molding step. The molded part is then pyrolyzed at a high temperature (1,500° C.-2,500° C.) to obtain a highly porous carbon/carbon composite. This is followed by chemical vapor infiltration (CVI) of a carbon matrix into this porous structure. It is well-known that CVI is a very time-consuming and energy-intensive process and the resulting carbon/carbon composite, although exhibiting a high electrical conductivity, is very expensive.

Instead of using pyrolyzation and CVI to produce carbon/carbon composites, Huang, et al. (US Patent Application Pub. No. 2004/0229993, Nov. 18, 2004) discloses a process to produce a thermoplastic composite with a high graphite loading. First, polymer fibers, such as thermotropic liquid crystalline polymers or polyester, reinforcing fibers such as glass fibers, and graphite particles are combined with water to form a slurry. The slurry is pumped and deposited onto a sieve screen. The sieve screen serves the function of separating the water from the mixture of polymer fibers, glass fibers and graphite. The mixture forms a wet-lay sheet which is placed in an oven. Upon heating to a temperature sufficient to melt the polymer fibers, the wet-lay sheet is allowed to cool and have the polymer material solidify. Upon solidification, the wet-lay sheet takes the form of a sheet material with reinforcement glass fibers held together by globules of thermoplastic material, and graphite particles adhered to the sheet material by the thermoplastic material. Several of these sheets are then stacked, preferably with additional graphite powder interspersed between sheets, and compression-molded in a hot press. After application of heat and pressure in the press, one or more formed bipolar plates are obtained, where the bipolar plates are a composite of glass fibers, thermoplastic matrix and graphite particles. There are several drawbacks associated with this composite composition and method:

(1) The fabrication process is tedious, consisting of many manual operations, and is not readily amenable to mass production.

(2) The composition requires heating the mixture above the melting point of the thermoplastic material twice—(a) the first time being to melt out the thermoplastic solid, allowing the melt to flow to the contact points between reinforcement fibers so as to bond the fibers together when the thermoplastic is cooled and (b) the second time to melt the thermoplastic so as to wet the remaining reinforcement fibers and graphite powders and form the matrix of a structural composite plate when the thermoplastic solidifies. Since engineering thermoplastics typically have a high melting point (e.g., >220° C. for polyester), it would take some time to heat up to that temperature and take some time to cool it down. The cycle times are long and the process is energy-intensive.

(3) With this process, it appears difficult to achieve a graphite proportion above 50% (and, hence, conductivity above 100 S/cm) without interspersing additional graphite powder between layers of stacked preform sheets (an operation called "dry-lay") prior to compression-molding. This is evidenced by FIG. 2 of Huang's application, which indicates that all samples with the resulting conductivity greater than 100 S/cm were prepared by a combined wet-lay (slurry molding) and dry-lay procedure. Such labor-dependent operations make the whole process time-consuming and labor-intensive. Dry-laid graphite powder between layers, although imparting high electrical conductivity to the composite, tend to form graphite-rich interfacial layers which are brittle and weak and tend to compromise the mechanical integrity of the resulting composite laminate.

The flow field plate or bipolar plate should be constructed from inexpensive starting materials, materials that are easily formed into any plate configuration, preferably using a continuous molding process, and materials that are corrosion resistant in low temperature fuel cells and that do not require further processing such as high temperature pyrolyzation treatments. Any laminated or multi-layer plate should have adequate bonding between layers to ensure structural integrity and reduced contact resistance (reduced power loss due to joule heating).

Accordingly, a primary object of the present invention is to provide a highly conductive composite composition and a fuel cell flow field plate or bipolar plate from this composition that can be made with a continuous process, which is suitable for mass production. The resulting fuel cell component is highly conductive and, hence, can be used as a current collector in a fuel cell with reduced contact resistance.

Another object of the present invention is to provide a highly conductive composite material for fuel cell bipolar plates which can be made without involving high temperature treatments.

Still another object of the present invention is to provide a highly conductive composite material for fuel cell bipolar plates which can be made without involving melting and cooling a thermoplastic twice.

Another object of the present invention is to provide a highly conductive composite material for fuel cell bipolar plates which is based on a thermoset resin that can be molded with a fast cycle.

Another object of the present invention is to provide a process for continuously producing a highly conductive composite-based flow field plate or bipolar plate.

SUMMARY OF THE INVENTION

This invention provides a fuel cell flow field plate or bipolar plate having flow channels on faces of the plate, comprising an electrically conductive polymer composite. In one preferred embodiment, the composite is composed of (A) at least 50% by weight of a conductive filler, comprising at least 5% by weight reinforcement fibers, expanded graphite platelets, graphitic nano-fibers, and/or carbon nano-tubes (this at least 5% is based on the total weight % the composite); (B) thermoplastic at 1 to 49.9% by weight; and (C) thermoset binder at 0.1 to 10% by weight; wherein the sum of the conductive filler weight %, thermoplastic weight % and thermoset binder weight % equals 100% and the bulk electrical conductivity of the flow field or bipolar plate is at least 100 S/cm and, preferably, at least 200 S/cm. The thermoset binder resin has the advantage that it can be quickly cured so as to hold the reinforcement elements together, typically without a need to be heated to a high temperature and then cooled down slowly. The resulting preform is very easy to handle during subsequent molding operations. The thermoset resin is selected from the group consisting of unsaturated polyester resins, vinyl esters, epoxies, phenolic resins, polyimide resins, bismaleimide resins, polyurethane resins, and combinations thereof. A fast-curing or ultraviolet-curable resin is preferred.

The conductive filler comprises a conductive material selected from the group consisting of graphite powder, carbon/graphite fibers, metal fibers, carbon nano-tubes, graphitic nano-fibers, expanded graphite platelets, carbon blacks, metal particles, and combinations thereof. This filler may comprise some non-conductive fibers, such as glass fibers and polymer fibers, for the purpose of reinforcing or strengthening the composite without significantly reducing the electrical conductivity. Preferably, the thermoset binder is at 0.1 to 5% by weight and the thermoplastic is at 10 to 40% by weight. This composition is such that reinforcement fibers, carbon nano-tubes, graphitic nano-fibers, and/or expanded graphite platelets (those reinforcement elements having a high aspect ratio, such as a high length/thickness ratio or length/diameter ratio) form an overlapping, contiguous-strand backbone structure. Preferably, these high aspect-ratio elements are bonded together by the thermoset resin binder, or a combination of the thermoset binder and thermoplastic, to form a shape-retaining backbone. This shape-retaining backbone or "preform" makes it easily handleable for subsequent molding, embossing and/or stamping operations to form a flow field or bipolar plate.

In another preferred embodiment, the composite comprises an electrically conductive polymer composite having: (A) at least 50% by weight of a conductive filler, comprising at least 5% by weight reinforcement fibers, expanded graphite platelets, graphitic nano-fibers, and/or carbon nano-tubes; (B) a polymer matrix material at 1 to 49.9% by weight; and (C) a polymer binder at 0.1 to 10% by weight; wherein the sum of the conductive filler weight %, polymer matrix material weight % and polymer binder weight % equals 100% and the bulk electrical conductivity of the flow field plate or bipolar plate is at least 100 S/cm. In this case, the polymer matrix material is not a pure thermoplastic; instead, it may comprise a material selected from a thermoset resin, an interpenetrating network, a semi-interpenetrating network, an elastomer, or a combination thereof. The polymer binder can be advantageously selected from thermoset resins, but it does not have to be a thermoset resin. For instance, it can be a thermoplastic provided that heating and melting the thermoplastic to a high temperature (e.g., >200° C.) is not required. It is convenient to have a binder comprising a water soluble polymer. Vaporization of water allows the polymer to precipitate and bond to the reinforcement elements quickly. In one further preferred embodiment, the plate has a major surface having a skin layer less than 100 μm in thickness and having a polymer volume fraction less than 20%, preferably less than 10%. In other words, the skin layer is preferably composed of at least 80% conductive filler and more preferably at least 90% conductive filler. Such a skin layer prevents the formation of a resin-rich skin layer that otherwise has a high, dominating electrical resistance.

Still another preferred embodiment of the present invention is a process for producing a fuel cell flow field plate or bipolar plate that has the aforementioned characteristics. The process comprises (A) continuously or intermittently feeding and moving a sheet of porous substrate (e.g., a web), preferably from a drum or roller, toward a desired direction with the substrate having through-thickness pores; (B) mixing and feeding a conductive filler, a polymer binder (preferably a fast-curing thermosetting resin or fast-solidifying thermoplastic), a polymer matrix material (thermosetting, thermoplastic, elastomer, interpenetrating network, semi-interpenetrating network, etc.) and a carrier fluid (water or compressed air) onto the porous substrate and directing the carrier fluid to substantially flow through the pores, leaving behind a layer of a solid mixture of the filler, binder and matrix material on the substrate; (C) moving the substrate forward to allow the solid mixture layer to go through a compaction stage (e.g., between a pair of compaction rollers); and (D) heating and consolidating the solid mixture and generating flow channels on a surface (or two surfaces) of the solid mixture layer to form the desired flow field or bipolar plate. The step of heating and consolidating preferably comprises a step of embossing or matched-die molding the mixture layer.

BRIEF DESCRIPTION OF THE DRAWING

FIG. 9: Results of theoretical calculations on the effect of the presence of a skin layer on the conductivity of a filler-polymer composite, (a) the effect of skin layer resistivity and thickness; (b) the effect of skin layer resistivity, thickness and core layer conductivity.

FIG. 10: The effect of conductive filler type and proportion on the flexural strength of the phenolic matrix composite material.

DETAILED DESCRIPTION OF THE INVENTION

Figure 1:
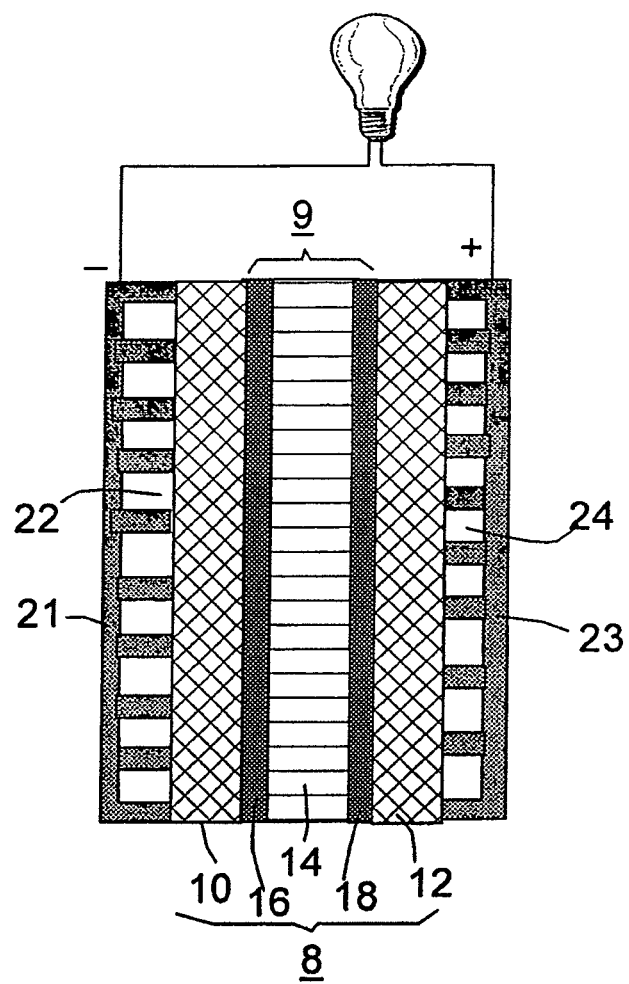
FIG. 1: A sectional view of a prior art PEM fuel cell consisting of a membrane electrode assembly (MEA) sandwiched between two flow field plates 21, 23.
Figure 2:
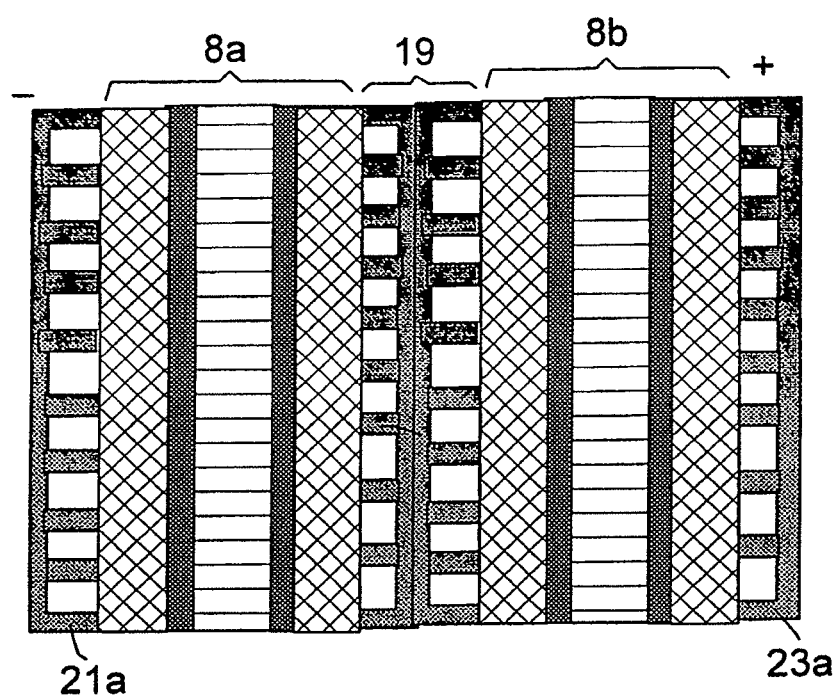
FIG. 2: A sectional view of a fuel cell stack consisting of two fuel cell units connected in series through a bipolar plate 19.

As shown in FIG. 1 and FIG. 2, a fuel cell typically comprises a pair of fluid distribution plates (also referred to as fluid flow field plates) 21 and 23, which are positioned on opposite sides of a membrane electrode assembly 8. Plate 21, which serves as a fuel distribution plate, is shaped to define fuel flow channels 22 facing towards anode diffuser 10. Channels 22 are designed to uniformly deliver the fuel to the diffuser, which transports the fuel to the anode catalyst layer 16. An input port and an output port (not shown), being in fluid communication with channels 22, may also be provided in flow field plate 21 so that carbon dioxide (in a DMFC) can be withdrawn from channels 22.

Flow field plate 23 is shaped to include fluid channels 24 for passage of a quantity of gaseous oxygen (or air). An input port and an output port (not shown) are provided in plate 23, which are in fluid communication with channels 24 so that oxygen (or air) can be transported through the input port to the cathode diffuser 12 and cathode catalyst layer 18, and water and excess oxygen (or air) can be withdrawn from channels 24 through the output port. Plate 23 is electrically conductive and in electrical contact with cathode diffuser 12. It can be used as a uni-polar plate (the positive terminal of the electrical current generated by the fuel cell unit) or as a part of a bi-polar plate (if integrated with fuel flow field plate 21). Shown in FIG. 2 is a fuel cell stack that consists of two fuel cell units. On the two opposite sides of the stack are two separate flow field plates 21a, 23a. Between the two MEAs (8a and 8b) is a bipolar plate 19, which can be viewed as two flow field plates integrated into one single component.

Figure 3A:
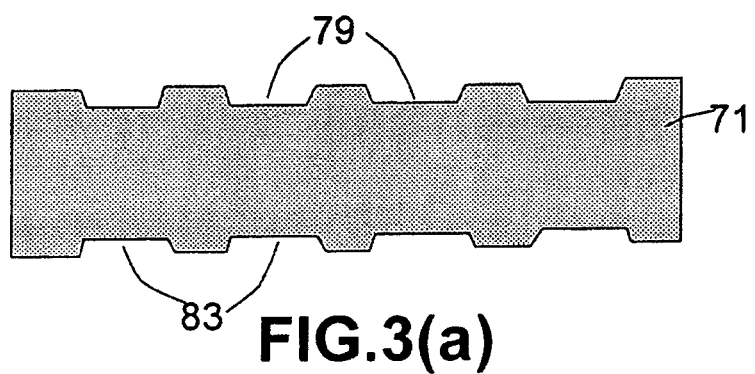
FIG. 3: A sectional view of (a) a bipolar plate 71 having fluid flow channels 79, 83 formed on its two opposite surfaces; (b) a flow field plate 71a having flow channels 79a formed on one of its major surfaces.
Figure 3B:
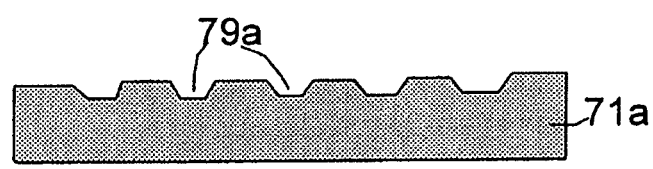

The preparation of a bipolar plate (71 in FIG. 3(a) containing surface flow field channels 79, 83 on two opposite major surfaces) or a flow field plate (71a in FIG. 3(b) having flow field channels 79a on only one major surface) begins with the fabrication of a porous preform from a conductive filler. This filler preferably comprises at least 5% by weight reinforcement fibers (glass fibers, polymer fibers or, preferably carbon/graphite fibers), expanded graphite platelets, graphitic nano-fibers (GNFs), and/or carbon nano-tubes (CNTs). These reinforcement elements have very high aspect ratios (length-to-thickness or length-to-diameter ratios) and, hence, are more amenable to the formation of a backbone structure. This backbone structure is typically characterized by having the elements forming a network of contiguous strands bonded by a binder polymer. This backbone structure, possibly with other conductive ingredients, makes a "preform" which is sufficiently rigid to enable subsequent molding operations. The conductive filler may comprise a conductive material selected from the group consisting of graphite powder, carbon/graphite fibers, metal fibers, carbon nano-tubes, graphitic nano-fibers, expanded graphite platelets, carbon blacks, metal particles, and combinations thereof. Some of these elements (e.g., powder or metal particles) have a lower aspect ratio, but they could impart good electrical conductivity to the resulting composite.

The elements of a preform (such as reinforcement fibers, expanded graphite platelets, graphitic nano-fibers, and/or carbon nano-tubes) will be bonded by a thermoset binder at 0.1 to 10% by weight. The thermoset resin binder is selected from the group consisting of unsaturated polyester resins, vinyl esters, epoxies, phenolic resins, polyimide resins, bismaleimide resins, polyurethane resins, and combinations thereof. A selected amount of thermoplastic, at 1 to 49.9% by weight; preferably in the form of short fibers or filaments (e.g., nylon fiber, polyester fiber, or polypropylene fiber) may also be incorporated in the preform during the preform fabrication process. Any thermoplastic, preferably those that can be easily made into fibrous form, can be used as part of the present composition. This thermoplastic material will be melted during the subsequent molding operation and fill the interstices between reinforcement elements. Upon solidification, the thermoplastic becomes the matrix material of the resulting conductive composite.

Figure 4A:
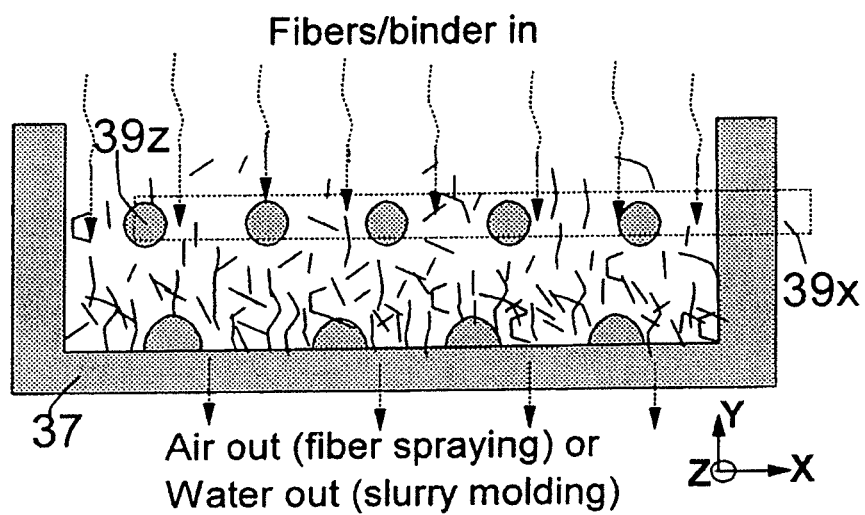
FIG. 4: (a) Schematic of a slurry molding- or directed fiber/binder spray-based process for producing a preform to a flow field plate; (b) the resulting flow field plate 41 having coolant channels 38, 38x; (c) schematic of a continuous process for producing highly conducting flow field plates or bipolar plates; (d) another version of a continuous process for producing highly conducting flow field plates or bipolar plates; and (e) the preform, with all ingredients held in place by a binder resin, may be collected on a roller and molded later.
Figure 4B:
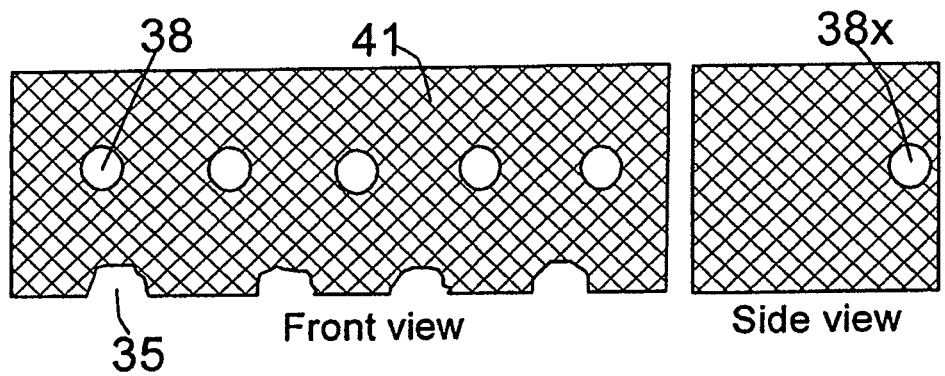

Several fabrication techniques can be employed to fabricate a conductive preform—a monolithic body having a desired porosity. In one preferred embodiment of the present invention, the porous preform material is made to an appropriate shape by a conventional slurry molding technique using chopped or milled carbon fibers of various lengths. In another preferred embodiment, the porous preform can be made by using a fiber/binder spraying technique. In yet another preferred embodiment, the preform may be made by adding fine-scale conductive fillers (such as nano-scaled graphene plates (NGPs), sub-micron graphite powder particles, graphitic nano fibers (GNFs), carbon blacks, metal nano particles, and carbon nano-tubes (CNTs)) to a pre-made fiber mat. These methods can be carried out as follows:

A. Slurry Molding Route:

An aqueous slurry is prepared which comprises a mixture of carbon fibers having lengths typically in the range of about 0.1 mm to about 10 mm and about 0.1 wt % to about 10 wt % thermoset resin powder binder (e.g., phenolic resin). In addition to carbon fibers, other conductive ingredients such as metal fibers, CNTs, GNFs, NGPs, expanded graphite plates, carbon blacks, metal particles, or a combination thereof can be a part of the slurry. A desired proportion of a thermoplastic (in powder, granule, or, preferably, fibrous or filamentous form) is also added to the slurry. The slurry is forced through a sieve or mold screen of a desired mesh size to trap the solids, thus producing a wet monolithic, which is subsequently dried at a temperature of less than 80° C. This mold screen is a part of a mold 37 (FIG. 4(a)) which, along with optional molding pins (e.g., 39z in the Z-direction and 39x in the X-direction as defined in FIG. 4(a)), helps define the fuel or oxidant transport and distribution channels 35 and optional coolant channels (e.g., 38, 38x in the resulting preform 41, FIG. 4(b)). Alternatively, these channels can be produced at a later stage during the subsequent composite molding.

The initial porosity of the preform, in the slurry molded and dried condition, is typically in the range 50-90%. If necessary, the dried monolith preform is further densified. The phenolic resin binder is cured in a shaped steel mold at a temperature in the range of about 120° C. to about 160° C., preferably about 130° C. (sufficient to cure the thermoset binder, but not high enough to melt the thermoplastic). Other alternative types of binder material (such as fast curing epoxy resins and ultraviolet curable resins) may be used, which serve to provide rigidity or some integrity to the resulting preform (FIG. 5(a)) prior to thermoplastic matrix material consolidation.

Figure 5:
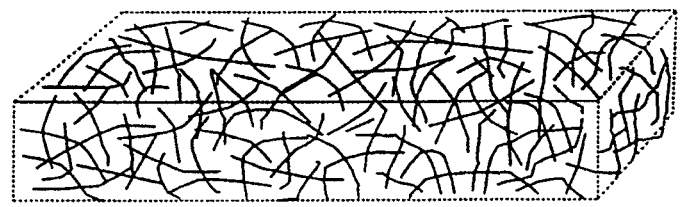
FIG. 5: (a) Schematic of a preform comprising reinforcement elements (e.g., fibers) preferably forming a backbone of contiguous strands; (b) reinforcements elements 33a, 33b, 33c are bonded by resin binder 35a, 35b.
Figure 5:
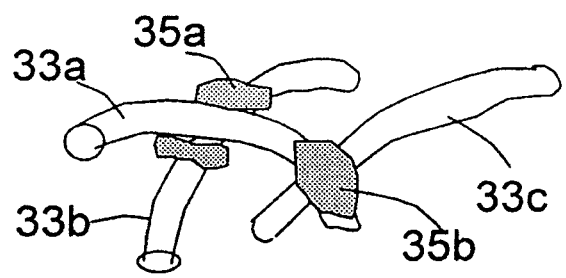

In the above example, only about 0.1 wt % to about 10 wt % binder resin (more typically about 0.5 wt % to 3 wt. %) was typically used for the primary purpose of providing a desired level of rigidity to the fiber preform, prior to the next step of thermoplastic matrix consolidation. The reinforcement elements 33a, 33b, 33c (fibers, plates, etc.) are bonded together by the thermoset binder 35a, 35b, as illustrated in FIG. 5(b). These reinforcement elements preferably form an overlapping, contiguous-strand backbone structure, as illustrated in FIG. 5(a), which is a preferred form of the "preform". The backbone structure may comprise glass fibers, high-strength polymer fibers (e.g., aromatic polyamide and ultra high molecular weight polyethylene), ceramic fibers and the like for the sole purpose of providing structural integrity to the preform. However, they are not electrically conductive materials.

B. Fiber/Binder Spraying Route:

The directed fiber spray-up process utilizes an air-assisted chopper/binder guns (or fiber/binder spraying guns) which convey carbon fibers (and/or other reinforcement elements) and a binder to a molding tool (e.g., a perforated metal screen shaped identical or similar to the part to be molded). In addition to carbon fibers, other conductive ingredient such as metal fibers, carbon nano-tubes, graphitic nano-fibers, nano-scaled graphene plates, expanded graphite plates, carbon blacks, or a combination thereof (plus thermoplastic fibers or granules) can be a part of the air-driven stream of preform ingredients that impinges upon the metal screen. This shaped screen is a part of a mold 37 (FIG. 4(a)), which also contains molding pins (e.g., 39z in the Z-direction and 39x in the X-direction as defined in FIG. 4(a)). These pins will help define the fuel or oxidant transport/distribution channels 35 and optional coolant channels (e.g., 38, 38x in the resulting preform 41, FIG. 4(b)). The chopped fibers may be held in place on the screen by a large blower drawing air through the screen. Once the desired thickness of reinforcement has been achieved, the chopping system is turned off and the preform is formed by polymerizing or curing the binder. The binder resin does not have to be added to the mixture during the fiber/filler blowing step; instead, it can be blown into the preform once all the reinforcement elements are in place. The binder can be an ultraviolet-curable resin or other fast-curing resins.

Once stabilized, the preform is cooled and removed from the screen. It may be noted that the coolant channels or fluid flow field channels can be built in the bipolar plate or flow field plate at a later stage using matched-die molding, for instance. The surface flow channels may also be created by embossing.

C. Fiber Mat Route:

This route may begin with provision of a highly porous fiber mat, which is basically composed of carbon and/or glass fibers bonded at their points of contact by a binder. The mat has interconnected interstices or voids between fibers. Slurry molding- or directed fiber blowing-type procedure is then used to add thermoplastic fibers/powders and fine-scaled (preferably nano-scaled) conductive elements such as CNTs, NGPs, GNFs, graphite powders, metal nano particles and carbon black) into the voids of the fiber mat to produce a preform. Glass or carbon fiber mats are commercially available. They typically contain some pre-applied binder resin to impart rigidity and strength to the mat.

Figure 4C:
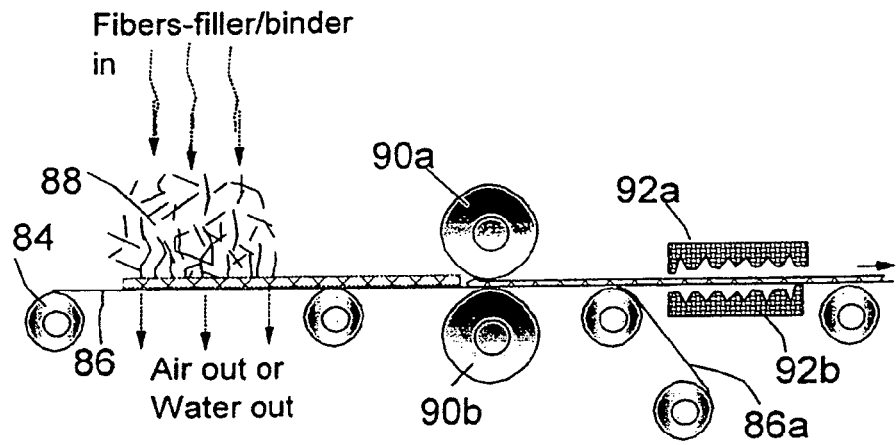

Each one of the above three routes can be implemented as a continuous process. For instance, as shown in FIG. 4(c), the process begins with pulling a web 86 (porous sheet) from a roller 84. The moving web receives a stream of slurry 88 (as described in the above-described Slurry Molding Route) from above the web. Water sieves through the web with all other ingredients (a mixture of fillers, binder, thermoplastic fibers, etc.) remaining on the surface of the web being moved forward to go through a compaction stage by a pair of compaction rollers 90a, 90b. Heat may be supplied to the mixture before, during, and after compaction to help cure the thermoset binder for retaining the shape of the resulting preform. The preform then goes through embossing or matched-die molding by a pair of embossing rollers or matting mold platens 92a, 92b to create flow channels on one or both major surfaces of the preform, which is also consolidated to become a flow field plate or bipolar plate. Preferably, the moving web 86a is separated from the preform 91 and collected by a winding roller 84a. It is also preferred that the mold platens 92a, 92b are replaced by a pair of embossing rollers (not shown). Alternatively, the compaction rollers 90a, 90b may also serve as embossing rollers for creating flow channels. In this latter case, the mold platens 92a, 92b will not be needed. A cutting device may be installed to separate individual plates in-line.

Similar procedures may be followed for the case where the mixture 88 of fillers, binder and thermoplastic is delivered to the surface of a moving web 86 by compressed air, like in a directed fiber/binder spraying route described above (FIG. 4(c)). Air will permeate through the web with other solid ingredients trapped on the surface of the web, which are conveyed forward. The subsequent operations are similar than those involved in the slurry molding route.

Figure 4D:
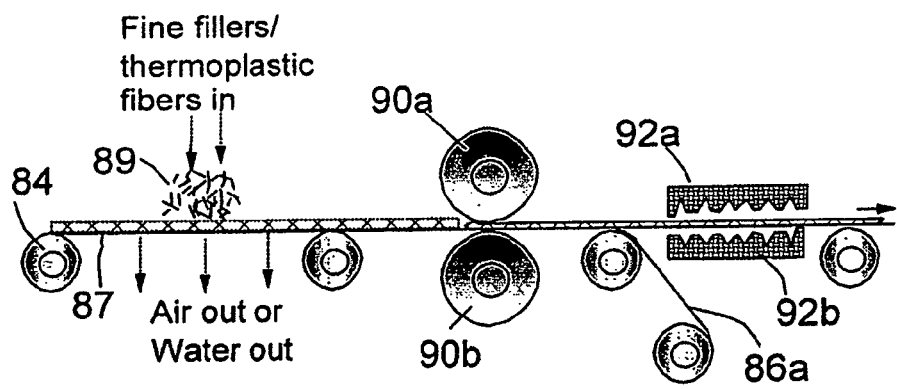

Alternatively, as indicated in FIG. 4(d), a continuous fiber mat 87 may be pulled from a roller 84. A mixture 89 of ultra-fine fillers and thermoplastic powders is then delivered, either through slurry pouring or directed spraying, to enter the macro pores of the fiber mat structure. Compaction rollers 90a, 90b also help to work the mixture into the pores of the mat. The resulting preform is then embossed/molded into flow field plates or bipolar plates. Embossing or molding may involve heating the preform to melt out the thermoplastic resin and cure the thermoset resin binder, and then cooling the structure down to room temperature.

Figure 4E:
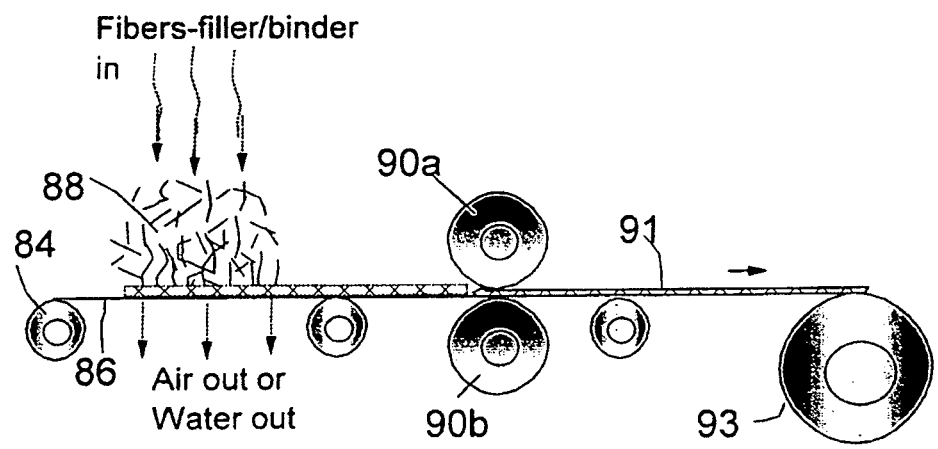

Alternatively, as schematically shown in FIG. 4(e), the preform 91, with all ingredients held in place by the thermoset binder, may be stored first (e.g., wrapped around a roller 93). At a later time, the preform may then be cut and fit into a mold (if so desired, a plurality of layers of cut preform may be stacked together) for consolidation of the plate and formation of surface flow channels and, possibly, coolant channels.

Figure 6A:
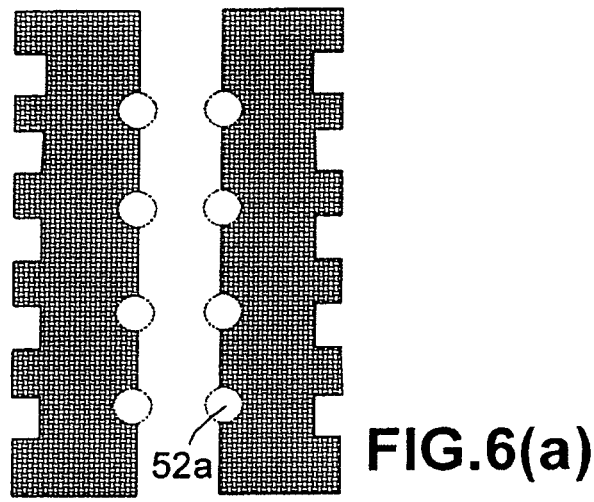
FIG. 6: (a) Schematic of two matting flow field plates each with half of the coolant channels; (b) the two plates, after being molded with the thermoset resin cured, are combined to form a bi-polar plate with coolant channels.
Figure 6B:
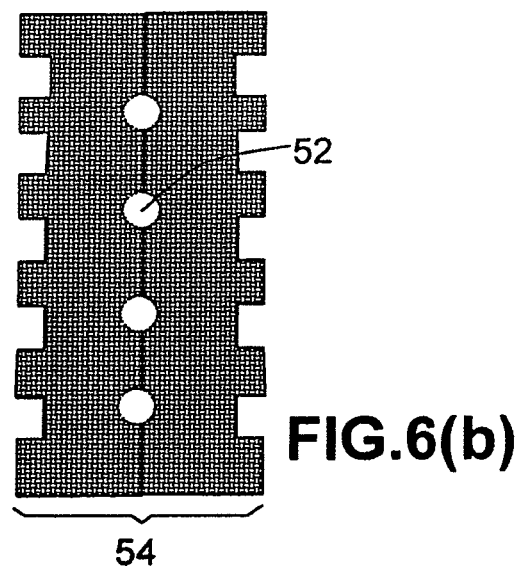

If coolant channels are needed, they can be created during the molding process in several ways. For instance, during the flow field plate molding process, the mold surface may be shaped to produce a part of a channel groove (e.g., 52a in FIG. 6(a)). Two matting flow field plates may then be positioned together to form a bipolar plate 54 (FIG. 6(b)) having complete coolant channels (e.g., 52).

Figure 7A:
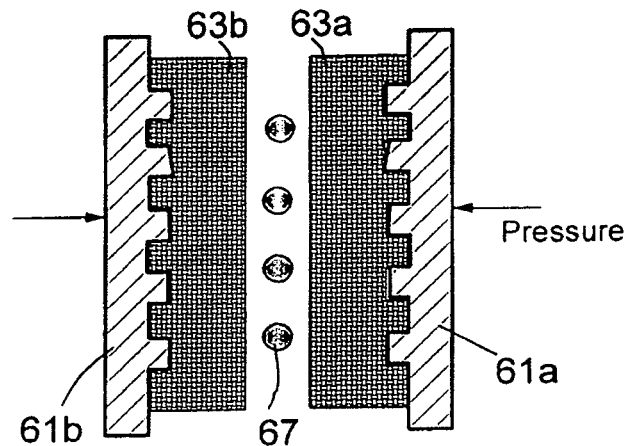
FIG. 7: (a) Schematic of two matting preform sheets being stacked and molded in a matched-die pressing process with molding pins being inserted to produce coolant channels; (b) the resulting integral bipolar plate with built-in coolant channels.
Figure 7B:
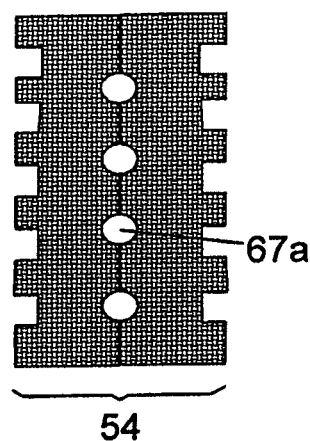
Figure 8:
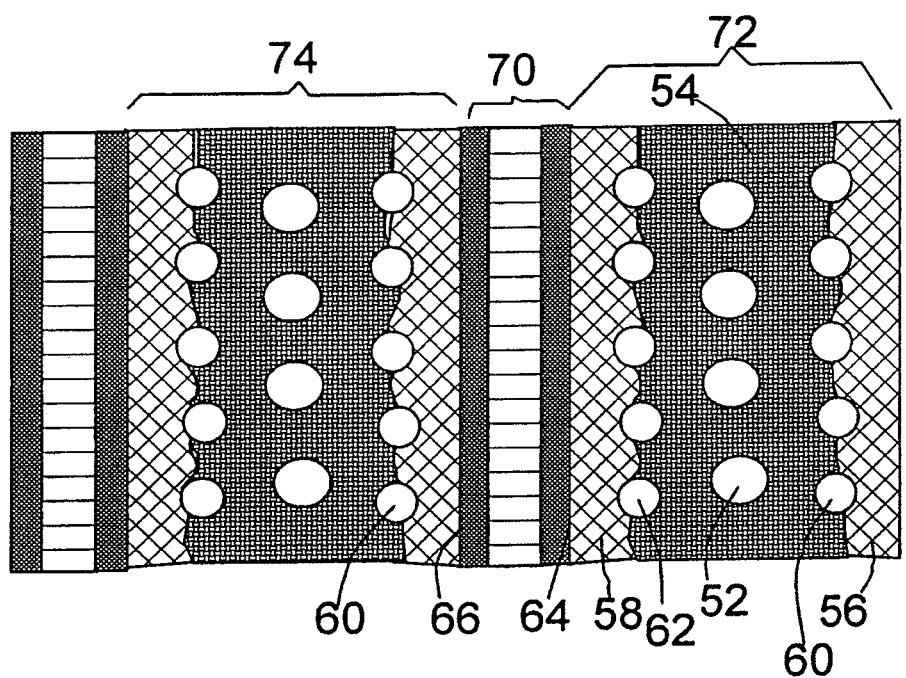
FIG. 8: A sectional view of stacked fuel cells using a series of bipolar plates in accordance with the present invention.

Preferably, coolant channels are built into a bipolar plate when it is molded. For instance, as schematically shown in FIG. 7(a), two composite preform sheets 63a or 63b may be molded between a pair of matched molds (61a, 61b) and a number of molding pins 67. Upon completion of the molding procedure, these pins, pre-coated with a mold release agent, may be pulled out of the composite structure to obtain an integral bipolar plate 54 (FIG. 7(b)) with built-in coolant channels 67a. Optionally, coolant channels may be fitted with connectors, preferably before the resin matrix material is solidified. FIG. 8 shows back-to-back flow field plates that are fabricated as one monolithic component 54, with coolant channels 52 formed as complete channels within the component, as well as reactant channels 60 & 62. The two outer surfaces of bipolar plate 54 are stacked against respective diffuser layers 56,58 (preferably made of carbon paper), which are in turn connected to catalyst-coated membrane (e.g., 70) to complete a fuel cell stack.

The type and proportion of the conductive filler are preferably chosen in such a way that the bulk conductivity of the resulting resin mixture is greater than 100 S/cm and further preferably greater than 200 S/cm. The US Department of Energy conductivity target for composite bipolar plates is 100 S/cm.

As indicated earlier, the conducting filler material may be selected from carbon fibers, metal fibers, metal particles (preferably nano-scaled), carbon nano-tubes (CNTs), graphitic nano-fibers (GNFs), nano-scaled graphene plates (NGPs), carbon blacks, or a combination thereof. Individual nano-scaled graphite planes (individual graphene sheets) and stacks of multiple nano-scaled graphene sheets are collectively called nano-sized graphene plates (NGPs). The structures of these materials may be best visualized by making a longitudinal scission on the single-wall or multi-wall of a nano-tube along its tube axis direction and then flattening up the resulting sheet or plate. These nano materials have strength, stiffness, and electrical conductivity that are comparable to those of carbon nano-tubes, but NGPs can be mass-produced at lower costs. They can be produced by reducing the expanded graphite particles to much smaller sizes (100 nanometers or smaller). The preparation of other nano-scaled carbon-based materials, including CNTs, GNFs, and carbon black, is well-known in the art. They are all commercially available, along with nano-scaled metal particles.

It may be noted that the matrix material does not have to be a thermoplastic and the binder resin does not have to be a thermoset. The matrix material can be a thermoset (including an interpenetrating network), a thermoplastic, a thermoplastic elastomer, a combined thermoset/thermoplastic (e.g., a semi-interpenetrating network), a rigid rubber or elastomer. A thermoset resin matrix can be advantageous since a molded part can be separated from a mold as soon as curing is achieved to a desired extent; no cooling is required. By contrast, cooling is required of a thermoplastic matrix composite after hot molding. Thermoplastic melts are also of higher viscosity and more difficult to process.

Hence, another preferred embodiment of the present invention is a fuel cell flow field plate or bipolar plate having flow channels on faces of the plate, comprising an electrically conductive polymer composite having: (A) at least 50% by weight of a conductive filler, comprising at least 5% by weight reinforcement fibers, expanded graphite platelets, graphitic nano-fibers, and/or carbon nano-tubes; (B) a polymer matrix material (not a pure thermoplastic) at 1 to 49.9% by weight; and (C) a polymer binder at 0.1 to 10% by weight; wherein the sum of the conductive filler weight %, polymer matrix material weight % and polymer binder weight % equals 100% and the bulk electrical conductivity of the flow field plate or bipolar plate is at least 100 S/cm, typically or preferably greater than 200 S/cm.

The binder resin serves a primary function of rapidly bonding together the reinforcement fibers and other conductive elements to produce a preform that is rigid enough for easy handling. With that purpose in mind, other types of polymer can be used as a binder. For instance, a water-soluble polymer like poly (vinyl alcohol) and polyethylene oxide can be dissolved in water or a mixture of water and ethanol. The resulting solution can be used as a dispersing medium for the slurry in the process of slurry molding of the preform. In the case of compressed air-assisted directed fiber spraying process, a dilute polymer-water solution may be blown through the stacked fibers/fillers (preform) with water and alcohol being quickly removed with heat. The remaining polymer residues will serve to bond together the reinforcement elements.

In one preferred embodiment, the polymer matrix material comprises a material selected from a thermoset resin, an interpenetrating network, a semi-interpenetrating network, an elastomer, or a combination thereof. This matrix material is preferably added to the preform in a solid powder form. Even a thermosetting resin with a proper degree of curing can be made into a powder form (e.g., epoxy, phenolic, and polyimide resins). These powders may be incorporated to a preform using any of the above three routes: slurry molding (wet-lay), directed fiber/binder spraying, and fiber mat.

Again, conductive filler may comprise a conductive material selected from the group consisting of graphite powder, carbon/graphite fibers, metal fibers, carbon nano-tubes, graphitic nano-fibers, nano-scaled graphene plates, carbon blacks, metal particles, and combinations thereof. Preferably, the conductive filler is at 50 to 75% by weight, which gives a good balance of electrical conductivity and mechanical properties (strength, stiffness, and flexibility). The preform may be composed of reinforcement fibers, carbon nano-tubes, graphitic nano-fibers, and/or expanded graphite platelets that form an overlapping, contiguous-strand backbone structure or a mat. These reinforcement elements are bonded together by the polymer binder material at their points of contact. The final consolidation process involves heating to cure the resin and impressing the flow channels and other surface features to the composite for forming the final plates.

The present invention also provides a fuel cell or a stack of fuel cells that comprises a highly conductive flow field plate or bipolar plate component as defined in any of the aforementioned preferred embodiments. The resulting fuel cell system is of lower costs (due to their amenability to mass production) and better performance (due to lower contact resistance and internal resistance and, hence, higher voltage).

Conductivity measurements can be made by using the four-point probe method on small-sized plate samples. Table 1 summarizes the parameters and properties of the samples prepared in the present study. These examples have clearly demonstrated the superior electrical conductivity of the presently invented composite compositions and the composite-based flow field plate or bipolar plate products. These conductivity values are far superior to those of most of prior art bipolar plates.

TABLE 1

Composition and properties of highly conductive polymer composites
(Gr = graphite powder, GNF = graphitic nano-fibers,
NGP = nano graphene plate, EG = expanded graphite platelets).

| Example | Matrix | Binder | Preform Backbone | Conductive Fillers | $\sigma$ (S/cm) | Flexural strength, MPa |
|---|---|---|---|---|---|---|
| | Thermoset | | | | | |
| 1 | 48% Phenolic | 2% UV curable epoxy | 10% carbon fiber | 40% Gr powder | 75 | 32.5 |
| 2 | 38% Phenolic | 2% UV curable epoxy | 10% carbon fiber | 45% Gr + 5% NGP | 184 | 35.4 |
| 3 | 33% Phenolic | 2% UV curable epoxy | 10% carbon fiber | 50% Gr + 5% NGP | 221 | 35.2 |
| 4 | 28% Phenolic | 2% UV curable epoxy | 10% carbon fiber | 50% Gr + 10% NGP | 250 | 38.7 |
| 5 | 23% Phenolic | 2% UV curable epoxy | 10% carbon fiber | 55% Gr + 10% NGP | 277 | 37.5 |
| | Thermoplastic | | | | | |
| 6 | 48% Nylon 6/6 | 2% UV curable epoxy | 8% carbon fiber + 2% GNF | 40% Gr powder | 76 | 62 |
| 7 | 38% Nylon 6/6 | 2% UV curable epoxy | 8% carbon fiber + 2% GNF | 50% Gr powder | 186 | 54 |
| 8 | 33% Nylon 6/6 | 2% phenolic | 10% carbon fiber | 55% Gr powder | 228 | 53 |
| 9 | 28% Nylon 6/6 | 2% phenolic | 10% carbon fiber | 60% Gr powder | 256 | |
| 10 | 23% Nylon 6/6 | 2% phenolic | 10% carbon fiber | 55% Gr + 10% EP | 280 | |
| 11 | 23% Nylon 6/6 | 2% phenolic | 10% glass fiber | 65% Gr powder | 203 | |
| 8a | 35% Nylon 6/6 | 2% phenolic | 10% carbon fiber | 53% Gr powder | 107 | No Gr or EG skin |

TABLE 1-continued

Composition and properties of highly conductive polymer composites
(Gr = graphite powder, GNF = graphitic nano-fibers,
NGP = nano graphene plate, EG = expanded graphite platelets).

| Example | Matrix | Binder | Preform Backbone | Conductive Fillers | σ (S/cm) | Flexural strength, MPa |
|---|---|---|---|---|---|---|
| 9a | 30% Nylon 6/6 | 2% phenolic | 10% carbon fiber | 58% Gr | 121 | No Gr or EG skin |
| 10a | 25% Nylon 6/6 | 2% phenolic | 10% carbon fiber | 55% Gr + 8% EP | 132 | No Gr or EG skin |

It may be noted that Samples 1-11 were prepared in such a way that a thin layer of fine powder of graphite, expanded graphite platelets, or nano-scale graphene plates were sprayed between the preform surface and the surface of a mold, for both major surfaces of a preform, prior to heating and consolidating. This is easily achieved by spraying a thin layer of fine graphite powder, NGPs, or expanded graphite platelets on the surface of the molds, instead of spraying a mold releasing agent. Since a mold releasing agent is normally needed in all polymer and composite molding operations anyway, this does not add an extra step to the process. Graphite-type materials are surprisingly great mold-releasing agents. This step effectively created a thin, graphite-rich, substantially polymer-free skin layer that is highly conductive. (This layer also makes it easy to remove the molded plate from the mold surface.) By contrast, those samples (e.g., Examples 8a, 9a, and 10a) prepared without such a step, tend to form a polymer-rich skin layer that could significantly increase the total resistance of a plate. As compared to Samples 8-10, the measured conductivity values of corresponding Samples 8a-10a are significantly lower. This is a highly surprising, yet very important observation because the presence of the two polymer-rich skin layers of a bipolar plate could significantly increase the contact resistance and joule loss of the whole fuel cell stack.

This dramatic reduction in electrical conductivity of a molded composite plate without a graphite coating skin may be understood as follows: A molded composite plate may be viewed as a three-layer structure with the skin, core and skin layers electrically connected in series. The total resistance is the sum of the resistance values of the three layers: $R=R_1+R_2+R_3=\rho_1(t_1/A_1)+\rho_2(t_2/A_2)+\rho_3(t_3/A_3)=(1/\sigma_1)(t_1/A_1)+(1/\sigma_2)(t_2/A_2)+(1/\sigma_3)(t_3/A_3)$, where $\rho$=resistivity, $\sigma$=conductivity, t=thickness, and A=area of a layer, and, approximately, $A_1=A_2=A_3$. Scanning electron microscopic examinations reveal that the resin-rich skin layers in composite materials are typically 0.1-10 μm thick. The resistivity of Nylon 6/6 (a thermoplastic) is typically in the range of $10^{12}$-$10^{15}$ ohm-cm and that of epoxy is slightly higher, $10^{15}$ or greater. In contrast, the resistivity of graphite powder or expanded graphite platelets is typically in the range of $10^{-5}$-$10^{-3}$ ohm-cm. A skin layer, even as thin as 1 nm-0.1 μm could completely dominate the over-all resistivity of the composite bipolar plate.

TABLE 2

Composite conductivity as a function of skin layer resistivity (skin thickness = 1 nm).

| Top layer resistivity $\rho_1$ (Ω-cm) | Top layer thickness $t_1$ (cm) | Core layer resistivity $\rho_2$ (Ω-cm) | Core layer thickness $t_2$ (cm) | Active area A (cm²) | Bipolar plate resistance R (Ω) | Bipolar plate resistivity $\rho$ (Ω-cm) | Bipolar plate conductivity $\sigma$ (S/cm) |
|---|---|---|---|---|---|---|---|
| 1.00E+12 | 1.00E−07 | 0.01 | 1 | 100 | 2000.0001 | 199999.97 | 5E−06 |
| 1.00E+10 | 1.00E−07 | 0.01 | 1 | 100 | 20.0001 | 2000.0096 | 0.000499998 |
| 1.00E+08 | 1.00E−07 | 0.01 | 1 | 100 | 0.2001 | 20.009996 | 0.049975022 |
| 1.00E+06 | 1.00E−07 | 0.01 | 1 | 100 | 0.0021 | 0.20999996 | 4.761905714 |
| 1.00E+04 | 1.00E−07 | 0.01 | 1 | 100 | 0.00012 | 0.012 | 83.33335 |
| 1.00E+02 | 1.00E−07 | 0.01 | 1 | 100 | 0.0001002 | 0.01002 | 99.80041916 |
| 1.00E+00 | 1.00E−07 | 0.01 | 1 | 100 | 0.0001 | 0.0100002 | 99.99802004 |

This is further illustrated in Table 2, FIG. 9(a) and FIG. 9(b), which are results of some simple calculations. As demonstrated in Table 2 and FIG. 9(a), with a core layer of 1 cm in thickness and 100 S/cm in conductivity and with a skin layer resistivity of $10^{12}$ ohm-cm (assuming a pure resin skin), the over-all conductivity of the composite is only $5\times10^{-6}$ S/cm even with a skin layer thickness as small as 1 nm. By decreasing the skin layer resistivity to $10^6$ ohm-cm and with the same skin layer thickness of 1 nm, the composite conductivity would still be relatively low (4.76 S/cm). By contrast, if the skin layer is relatively polymer-free and graphite-rich, this layer would have a relatively high conductivity ($10^2$-$10^5$ S/cm) and the over-all composite conductivity will be dominated by the core layer conductivity, which is illustrated in FIG. 9(b). The over-all composite conductivity would be comparable to the conductivity of the core layer. Hence, it is reasonable to say that the measured conductivity values for Samples 1-11, as listed in Table 1, are good assessment of not only the over-all, but also the core layer conductivity.

It may be further noted that the composite bipolar plates prepared in the present study (without a sprayed layer of graphite powder; e.g., Samples 8a-10a) were usually found to have a resin-rich layer which is deficient in, but not totally free from, conductive elements. Some conductive elements were found to sporadically protrude out of the plate surface. Hence, the effective conductivity of this skin layer is expected to be much higher than that of a neat resin and estimated to be in the range of 0.01-1 S/cm. The volume fraction of these protruding conductive elements is typically less than 20% and more typically less than 10%. With a sprayed layer of fine graphite powder-, expanded graphite powder-, or NGP-based mold releasing agent, a portion of this agent (fine particles) are incorporated in the surface of the composite during the composite molding or embossing procedure. The resulting graphite-rich skin layer is estimated to have a conductivity in the range of 100-1000 S/cm. In this case, the skin layer typically has a thickness thinner than 200 μm (more typically thinner than 100 μm) and a polymer volume fraction less than 20% (more typically less than 10%). There is no need to interleaf graphite powders between preform sheets (which could complicate the production process and compromise the composite strength). There is also no need to intentionally produce a laminated sandwich structure with a core layer of one thermoplastic composite (e.g., polyethylene terephthalate-based) to provide mechanical strength and extra top and bottom layers of a different thermoplastic composite (e.g., poly vinylidene fluoride-based) to enhance electrical conductivity, as suggested by Huang, et al. (US Patent Application Pub. No. 2004/0229993, Nov. 18, 2004). The sandwich structure clearly would significantly increase the process complexity and final product costs. In contrast, our inventive technology was able to achieve the desired properties without creating such a sandwich structure.

Another noteworthy feature is the surprising observation that, within the conductive filler proportion range studied (e.g., Examples 1-5), an increase in the NGP percentage always leads to an increase in the composite flexural strength and electrical conductivity. However, this is not the case with graphite powder, which tends to increase the electrical conductivity, but could decrease the composite strength (FIG. 10). This indicates the superiority of NGPs in terms of imparting both electrical conductivity and mechanical strength to the composite material.

In all of the samples prepared in the present study, the over-all conductivity values of the composite plates are very impressive. The processes for preparing these composites are continuous and can be automated. The processing costs are relatively low.

Thus, in summary, another preferred embodiment of the present invention is a process for producing a fuel cell flow field plate or bipolar plate as described above. The process comprises (A) continuously or intermittently feeding and moving a sheet of porous substrate (e.g., a web) toward a desired direction with the substrate having through-thickness pores; (B) mixing and feeding a conductive filler, a polymer binder, a polymer matrix material (thermosetting, thermoplastic, elastomer, interpenetrating network, semi-interpenetrating network, etc.) and a carrier fluid (water or compressed air) onto the porous substrate and directing the carrier fluid to substantially flow through the pores, leaving behind a layer of a solid mixture of the filler, binder and matrix material on the substrate; (C) moving the substrate forward so as to allow the solid mixture layer to go through a compaction stage (e.g., between a pair of compaction rollers); and (D) heating and consolidating the solid mixture and generating flow channels or other features on a surface of the mixture layer to form the desired flow field or bipolar plate. The step of heating and consolidating preferably comprises embossing or matched-die molding the mixture layer.

Preferably, the process includes a step of coating an embossing surface or mold surface with a layer of graphite or NGP powder prior to embossing or molding. This layer of graphite-based powder material, positioned between a mold or embossing roller surface and a surface of the solid mixture layer, will be incorporated as a graphite-rich skin layer on the plate surface after melting and consolidation of the polymer matrix. If the binder is a thermosetting material, the process should preferably further comprise a step of curing the thermoset resin binder before, during, and/or after the compaction stage. If the binder material is a water-soluble polymer material, the process should preferably further comprise a step of rapidly removing water from the mixture, allowing the polymer to precipitate and bond the reinforcement elements together.

What is claimed is:

1. A continuous, in-line roll-to-roll process for producing a fuel cell flow field plate or bipolar plate, said process comprising:
   (A) continuously feeding and unwinding a sheet of porous substrate from a roller toward a desired direction, said substrate having through-thickness pores;
   (B) mixing and feeding a conductive filler, a thermoset binder, a thermoplastic matrix material and a carrier fluid onto said porous substrate and directing said carrier fluid to substantially flow through said pores, leaving behind a layer of a solid mixture of said filler, binder and matrix material on said substrate, wherein said binder is in an amount of at least 0.1% but less than 5% by weight of the total weights of the conductive filler, thermoset binder, and thermoplastic matrix combined;
   (C) moving said substrate so as to allow said solid mixture layer to go through a compaction stage;
   (D) heating and consolidating said solid mixture layer and generating flow channels on a surface of said solid mixture layer to form said flow field or bipolar plate; and
   (E) rewinding the porous substrate onto a roller.

2. The process as defined in claim 1, wherein said carrier fluid comprises water and said step of mixing and feeding comprises slurry molding.

3. The process as defined in claim 1, wherein said carrier fluid comprises compressed air.

4. The process as defined in claim 1, wherein said step of heating and consolidating comprises a step of embossing or matched-die molding said mixture layer.

5. The process as defined in claim 4, further comprising a step of coating an embossing tool surface or mold surface with a layer of fine graphite, expanded graphite and/or nano-scaled graphene plate powder prior to embossing or molding.

6. The process as defined in claim 1, further comprising a step of curing said thermoset resin binder before, during, and/or after said compaction stage.

7. A continuous roll-to-roll process for producing a fuel cell flow field plate or bipolar plate, said process comprising:
   (A) continuously feeding and unwinding a sheet of porous substrate from a roller toward a desired direction, said substrate having through-thickness pores;
   (B) mixing and feeding a conductive filler, a polymer binder, a polymer matrix material and a carrier fluid onto said porous substrate and directing said carrier fluid to substantially flow through said pores, leaving behind a layer of a solid mixture of said filler, binder and matrix material on said substrate, wherein said binder is in an amount of at least 0.1% but less than 5% by weight of the total weights of the conductive filler, thennoset polymer binder, and thermoplastic polymer matrix combined and said conductive filler is selected from the group consisting of graphite powder, carbon/graphite fibers, expanded graphite platelets, carbon blacks, metal particles, and combinations thereof;
   (C) moving said substrate so as to allow said solid mixture layer to go through a compaction stage;

(D) heating and consolidating said solid mixture and generating flow channels on at least a surface of said solid mixture layer to form said flow field or bipolar plate; and (E) rewinding the porous substrate onto a roller.

8. The process as defined in claim 7, wherein said carrier fluid comprises water and said step of mixing and feeding comprises slurry molding.

9. The process as defined in claim 7, wherein said carrier fluid comprises compressed air.

10. The process as defined in claim 7, wherein said step of heating and consolidating comprises a step of embossing or matched-die molding said mixture layer.

11. The process as defined in claim 10, further comprising a step of coating an embossing tool surface or a old surface with a layer of fine graphite, expanded graphite and/or nano-scaled graphene plate powder prior to embossing or molding.

12. The process as defined in claim 1, wherein said binder occupies an amount of from 0.1% to 3% by weight of the total weights of the conductive filler, thermoset binder, and thermoplastic matrix combined.

13. The process as defined in claim 7, wherein said binder occupies an amount of from 0.1% to 3% by weight of the total weights of the conductive filler, thermoset binder, and thermoplastic matrix combined.

\* \* \* \* \*